United States Patent [19]

Lange

[11] 3,800,053

[45] Mar. 26, 1974

[54] PROCESS FOR PREPARING PROTEIN MONOFILAMENTS

[75] Inventor: Donald A. Lange, Minneapolis, Minn.

[73] Assignee: General Mills, Inc., Minneapolis, Minn.

[22] Filed: June 26, 1972

[21] Appl. No.: 266,200

[52] U.S. Cl.................. 426/364, 426/459, 426/802, 264/176 F
[51] Int. Cl. .............................................. A23j 3/00
[58] Field of Search.......... 99/14, 17; 264/83, 176 F

[56] References Cited
UNITED STATES PATENTS
2,682,466   6/1954   Boyer...................................... 99/14

*Primary Examiner*—A. Louis Monagell
*Assistant Examiner*—James Robert Hoffman
*Attorney, Agent, or Firm*—Anthony A. Juettner; Gene O. Enockson

[57] ABSTRACT

Protein monofilaments are prepared from oilseed protein materials and water through the formation of an extrudable plastic mass and the extrusion of same into a gaseous medium. The products find use as food supplements and as texturizing bases for foods such as meat analogs.

11 Claims, No Drawings

PROCESS FOR PREPARING PROTEIN MONOFILAMENTS

This invention relates to a method for preparing protein monofilaments and to the resulting monofilaments. More particularly, it relates to such a method wherein a protein containing plastic mass is prepared and forced while hot through an orifice directly into a gaseous medium to form protein monofilaments.

In recent years a great deal of effort has been expended on the production of texture retaining protein matrices as building blocks for a new series of foods, many of which have been so fabricated to simulate natural cuts of cooked meat, fish, fowl and the like. The early work of Robert A. Boyer as set forth in U.S. Pat. No. 2,682,466 has been extensively followed in this respect. In general, the Boyer process involves the preparation of a spinnable protein dope with subsequent spinning of the dope through a spinnerette into an acid coagulating bath to yield a tow of monofilament fibers. The fibers are caused to set-up or coagulate in the coagulating bath due to the lowering of the pH of the immerging streamlets of the dope to the isoelectric point of the protein. The fibers are oriented by stretching and the pH normally raised somewhat by washing or neutralization. The tow of fibers can then be used through admixture with binders, flavors, fats or oils, coloring agents and the like along with subsequent heat treatments to yield the indicated fabricated foods.

I have now discovered a new, simplified method for preparing protein monofilaments from protein source materials consisting essentially of defatted oil seed proteins having a protein content of at least about 50 percent by weight. Thus I have found that it is only necessary to form a hot plastic mass of the source material with water (with or without certain additives) and extrude such plastic mass through a small orifice or orifices to yield the protein monofilaments. The said monofilaments are new products which retain their textural identity even when added to aqueous liquids. The higher protein content monofilaments which are preferably stretched somewhat can be used to prepare meat analogs as discussed hereinabove with respect to wet spun fibers. They are generally less expensive than the wet spun fibers primarily due to the reduction of the amount of equipment required —i.e., no coagulating or set baths are required. Where comparable monofilament diameters are obtained, the monofilaments of my invention can serve as reasonably acceptable replacements for the wet spun fibers in the said meat analog preparations. The flavor characteristics of meat analogs prepared from the fibers of the present invention hold up better in retorting than the prior practices. Especially where the monofilaments of the invention have lower protein contents, they are readily broken into short lengths yielding a new form of protein additive for supplementing a variety of foods.

As indicated, the protein source material consists essentially of defatted oilseed proteins having a protein content of at least about 50 percent by weight. Of the oilseeds, soy protein materials are preferred due to their ready availability and functional properties. Other oilseed proteins such as rapeseed, cottonseed, peanut and sesame seed can be used. The oilseeds can be in the form of defatted flours, concentrates of increased protein content over the flours and isolates wherein most of the non-protein materials have been removed. The higher the protein content, the higher the strength in the new monofilaments. Thus where the protein content of the source material is above about 70 percent, i.e., 70 to 95 percent, by weight the monofilaments can be stretched and oriented and have good strength. Protein contents of less than about 70 percent by weight but within the recited range yield fibers which can readily be broken into short lengths. Such short-break fibers do, however, retain their structural and textural identity when placed in aqueous liquids.

Mixtures of the oilseed source materials can be used in the present invention. Thus, isolates can be mixed with flours and/or concentrates and the various oilseed materials can be used in combination with each other. Additionally, the oilseed source materials can be used in combination with other functional proteins, such as gluten, rennet casein and the like so long as such other protein materials do not alter the characteristics of the monofilaments to the extent that they can no longer be termed oilseed protein based monofilaments. The protein materials must be functional—that is, not heat or otherwise denatured so as to become relatively inactive.

The oilseed protein source material is mixed with water and heated to form the extrudable plastic mass. The amount of water can vary over relatively wide limits and optimally will generally be different for each protein source material or mixture of protein source materials. The water content needed to form the plastic mass will preferably fall within about 25–60 percent by weight based on the total composition of the extrudable plastic mass. In many instances, the water content will be in the especially preferred range of about 35 to 50 percent by weight of the total composition.

It was indeed surprising to find that protein monofilaments could be obtained from the protein source material and water alone in accordance with the process of the invention which requires no after-treatment. Also, surprisingly, the monofilaments can be obtained over a relatively broad pH range, with the properties of the monofilaments being tailored somewhat dependent on the pH used. Water soluble acids and bases can be added to alter the pH of the extrudable plastic mass and thence alter the pH and properties of the monofilaments. Of the water soluble acids, hydrochloric, acetic, citric and phosphoric are preferred. Of the water soluble bases, sodium and ammonium hydroxides are preferred. The pH can preferably vary from about 2.0 to 10.5, with the especially preferred range being from about 4.0 to 9.0. Monofilaments produced in the acid pH range generally show somewhat greater strength characteristics and thus are somewhat preferred.

Other additives can also be included in the extrudable plastic masses. In this respect, extrusion aids can be added to improve the extrudability of the compositions. Such materials can be organic or inorganic reducing agents, with the latter being preferred—i.e., the alkali metal and ammonium sulfites and bisulfites such as sodium sulfite. Plasticizers for the monofilaments can also be included. A preferred material is glycerol.

Additionally, my process makes it possible to incorporate flavors, colors, vitamins and the like internally in the monofilaments simply by including them in the extrudable plastic masses.

The oilseed protein source material, water and optional additives are mixed and heated until a relatively homogenous plastic mass is obtained. The plastic mass is preferably obtained at temperatures in the range of about 175° to 300° F., it being understood that the optimum temperature for each such plastic mass will depend somewhat on the particular protein source material employed, the water-protein source material ratio and the presence or absence of the optional additives. Temperatures in the upper part of the range tend to give monofilaments of increased strength. An especially preferred range for most of the plastic masses is from about 190°–285° F. The extrusion temperatures are below the point where the exiting monofilaments would puff to any appreciable extent. The materials can desirably be pre-mixed and then charged to an extruder equipped with heating and mixing means. A variety of such extruders are readily available commercially. Where the heating takes place in the extruder, the plastic mass will also be formed in the extruder. The extruder pressure is not critical, it being only necessary that sufficient pressure be employed to aid in the formation of and/or maintain the heated mass in a plastic state and then force the said plastic mass out of the extruder orifice or orifices to yield the protein monofilaments. As indicated above, the orifice or orifices will have a cross section or diameter of less than about 50 mils and even more preferably below about 10 mils (i.e., 2–10 mils) where the object is to obtain monofilaments for use in meat analog preparations.

The monofilaments form almost instantaneously as they exit from the extruder orifice into a gaseous atmosphere. Air is entirely suitable as the gaseous atmosphere simply as a matter of economic practicality. Of course other essentially inert gases such as nitrogen and the like can be used if desired.

The monofilaments prepared from the higher protein content source materials are desirably stretched somewhat as they leave the extruder. The stretching reduces the diameter of the monofilaments and tends to orient the protein molecules therein.

The monofilaments of the invention are new texturizing building blocks for foods and/or serve as protein supplements to foods. In the former respect, they can be mixed with binders, flavors, coloring agents and the like to yield fibrous products generally simulating natural cooked meat, fish or fowl portions. The short-break fibers can be used as external additives to ready-to-eat cereals, for example, to increase the protein content of such cereals or to maintain the over-all protein content thereof when the same are sugar coated.

The following examples serve to illustrate certain preferred embodiments of the invention without being limiting. In all of the examples the monofilaments were extruded into air at ambient room temperature.

EXAMPLE I

A protein containing mix was made up as follows:

| | |
|---|---|
| Soy isolate (Promine D, 80% by weight protein) | 1000 gm. |
| Water | 660 ml. |
| Na₂SO₃ | 10 gm. |
| Glycerine | 330 ml. |
| NH₄OH-15 N. | 80 ml. |

The above ingredients were mixed (pH=9.0) and then fed into a Wayne extruder equipped with a heater and a die having an 8 mil diameter circular die opening. The auger rotation was held at 34 rpm and the extrusion temperature was varied from 200° to 295° F. At 200° F. the monofilament was relatively weak and, as the temperature was increased to 225°, 235°, 245°, 255° and 270° F., the issuing monofilament increased in strength and was capable of being increasingly stretched. At 295°F., the monofilament strand contained some small bubbles indicating that for this plastic mass the puffing temperature was being approached.

EXAMPLE II

Example I was essentially repeated except using a 10 mil die opening, a temperature of 275°–285° F. and protein mix having a pH of 4.0 made up of the following ingredients:

| | |
|---|---|
| Promine D | 500 gm. |
| Water | 255 ml. |
| 12 N. HCl | 34.5 ml. |
| Glycerine | 165 gm. |
| Na₂SO₃ | 5 gm. |

There was obtained an off-white monofilament strand which was termed very strong.

EXAMPLE III

Example II was essentially repeated using the following mixes tailored to have different pH's:

| | A | B | C |
|---|---|---|---|
| Promine D | 500 gm. | 500 gm. | 500 gm. |
| Water | 220 ml. | 220 ml. | 233 ml. |
| NH₄OH — 15 N. | 13 ml. | — | — |
| HCl — 12 N. | — | — | 13.75 ml. |
| Glycerine | 165 gm. | 165 gm. | 165 gm. |
| Na₂SO₃ | 5 gm. | 5 gm. | 5 gm. |

The extrusion mixes had pH's of 9.4, 7.6 and 6.0, respectively. The pH 6.0 monofilaments were slightly stronger than those prepared from mixes A and B. However, all of the monofilaments had reasonable strength. The monofilaments from Examples II and III were tested for rehydration characteristics by soaking 10 gm. of the monofilaments in cold tap water for 5 minutes, draining on a screen for 5 minutes and then reweighing. Results were as follows:

| Monofilaments of Example | Rehydrated Weight (average of two tests) |
|---|---|
| III A | 62.5 gm. |
| III, B | 35 gm. |
| III, C | 24 gm. |
| II | 17 gm. |

This data indicates that the monofilaments prepared from alkaline pH mixes have higher water take-up than the monofilaments from acidic pH mixes.

EXAMPLE IV

Example III, C was essentially repeated except that the glycerine was reduced by 50 percent and also completely eliminated. Good monofilaments were obtained in both runs, the same being a little less pliable than monofilaments made from glycerine containing formulations.

EXAMPLE V

Example III, C was essentially repeated except that the HCl in the mixes was replaced with 14 gm. citric acid, 10 ml. 85 percent phosphoric acid and 15 ml. 99.7 percent acetic acid, respectively. Good monofilaments were obtained in all three instances.

EXAMPLE VI

Extrusion mixes were prepared from soy isolate (Promine FS — 90–93 percent by weight protein) and water using 1,000 gm. isolate, 705 ml. water and additions of 70 ml. conc. HCl, 15 ml. conc. HCl, no acid or base addition and 20 ml. 44 percent by weight aqueous sodium hydroxide, respectively. The mixes were extruded as in the previous Examples at 25 rpm through a die containing 3 mil openings (die temperature of 250°–80° F.). The resulting monofilaments having pH values of 3.5, 6.2, 7.2 and 8.8, respecitvely, varied in diameter from 4.7 to 6.3 mils. The tensile strengths of the fibers were all very good and increased as the pH increased. Water uptake also increased with increasing pH whereas the wet shear characteristics decreased.

EXAMPLE VII

The following extrusion mixes were prepared and extruded as in Example II:

|  | A | B | C | D |
|---|---|---|---|---|
| Promine D | 500 gm. | 460 gm. | 400 gm. | 100 gm. |
| Soy concentrate (Textrol — 60% by weight protein) | — | 40 gn | 100 gn. | 400 gn. |
| Water | 220 ml. | 220 ml. | 220 ml. | 220 ml. |
| Glycerine | 165 gm. | 165 gm. | 165 gm. | 165 gm. |
| Na$_2$SO$_3$ | 5 gm. | 5 gm. | 5 gm. | 5 gm. |
| HCl — 12 N. | 14 ml. | 14 ml. | 14 ml. | 14 ml. |

Good monofilaments were obtained. The monofilaments of D were not as strong as the others but had a higher water uptake. The monofilaments of B were slightly stronger than those of A and C and also had a somewhat better water uptake.

EXAMPLE VIII

Example VII, C was essentially repeated except that the following extrusion mixes were used:

|  | A | B | C |
|---|---|---|---|
| Promine D | 400 gm. | 400 gm. | 400 gm. |
| Gluten | 100 gm. | — | — |
| Lactalbumin | — | 100 gm. | — |
| Rennet casein | — | — | 100 gm. |
| Water | 235 ml. | 235 ml. | 235 ml. |
| HCl — 12 N. | 14 ml. | 14 ml. | 14 ml. |
| Na$_2$SO$_3$ | 5 gm. | 5 gm. | 5 gm. |

All of the resulting extrudable plastic masses produced long continuous monofilaments having reasonably good strength.

EXAMPLE IX

A mix was made up as follows:

| Defatted soy flour (55% by weight protein) | 500 gm. |
|---|---|
| Water | 285 ml. |
| HCl conc. | 5 ml. |

The mix (pH 6.2) was formed into a plastic mass and extruded similarly as in Example II (25 rpm, die temperature of 250° F., die openings were 3.5 mils). The monofilaments were fairly weak and broke readily into shorter lengths.

EXAMPLE X

The following extrusion mixes were prepared:

|  | A | B | C |
|---|---|---|---|
| Cottonseed protein concentrate (66.3% by weight protein) | 500 gm. | — | — |
| Sesame seed flour (47.0% by weight protein) | — | 500 gm. | — |
| Rapeseed protein concentrate (62% by weight protein) | — | — | 500 gm. |
| Water | 140 ml. | 250 ml. | 500 ml. |

Monofilaments of textural integrity were obtained in all instances when the mixes were extruded similarly as in Example IX. The strength was lower than when using an isolate such as soy isolate of higher protein content.

EXAMPLE XI

An extrusion mix was prepared from:

| Soy isolate | 1000 gm. |
|---|---|
| Water | 650 ml. |
| Conc. HCl | 15 ml. |
| Dry beef flavor | 25 gm. |

The mix when extruded similarly as in Example IX yielded monofilaments having a beefy flavor. Correspondingly, other flavors such as almond, coconut, lime, orange, walnut and the like have been incorporated into the extrusion mixes to yield flavored fibers.

EXAMPLE XII

The monofilaments prepared in Example VI were used to prepare ham analogs using the formula:

|  | % by Wt. |
|---|---|
| Monofilaments (70% solids) | 19.5 |
| Water | 60.2 |
| Vegetable Oil | 9.1 |
| Dried egg albumin | 3.8 |
| Soy isolate | 2.5 |
| NaCl | 2.1 |
| Sugar | 1.2 |
| Ham flavor | 0.67 |
| Monosodium glutamate | 0.4 |
| Smoke flavor | 0.36 |
| Vitamin and mineral mix | 0.14 |
| Caramel color | 0.03 |
| Red dye blend | 0.002 |

The ingredients were mixed and heated at 180°–185° F. under a pressure of about 8 psig. for 4½ minutes to yield ham flavored analogs (the pH of each mix was adjusted to about 5.5 to 6.1 by the addition of citric acid or sodium bicarbonate). The analogs prepared from the monofilaments having a pH of 6.2 or 7.2 had the overall best eating quality. The analog from the 8.8 pH monofilaments was softer but more moist whereas the analog from the pH 3.5 monofilaments was slightly grainy.

The embodiments of the invention in which an exclusive property is claimed are defined as follows:

1. The process of preparing protein monofilaments which comprises mixing a protein source material consisting essentially of defatted oilseed protein materials having a protein content of at least about 50 percent by weight with water wherein the water is present in an amount of about 25 to 60 percent by weight of the total composition, heating the mixture to form an essentially homogeneous, extrudable, plastic mass having a pH in the range of about 2.0 to 10.5, and extruding the hot plastic mass through an orifice or a multiplicity of orifices having a diameter of less than 50 mils directly into an essentially inert gaseous medium to yield the protein monofilaments.

2. The process of claim 1 wherein the oilseed protein material has a protein content of about 50 to 70 percent by weight.

3. The process of claim 1 wherein the oilseed protein material has a protein content of about 70 to 95 percent by weight.

4. The process of claim 1 wherein the water content of the composition is about 35 to 50 percent by weight.

5. The process of claim 1 wherein the plastic mass has a pH of about 4.0 to 9.0.

6. The process of claim 1 wherein the plastic mass also contains an extrusion aid and a plasticizer.

7. The process of claim 6 wherein the extrusion aid is sodium sulfite and the plasticizer is glycerine.

8. The process of claim 1 wherein the plastic mass also contains a flavoring agent.

9. The process of claim 1 wherein the extrusion is carried out at a temperature of about 175° to 300° F.

10. The process of claim 1 where the orifice diameter is from about 2 to 10 mils.

11. The process of claim 1 wherein the gaseous medium is air.

* * * * *